Sept. 12, 1944.  J. MIHALYI  2,358,082
DOUBLE EXPOSURE PREVENTION DEVICE
Filed March 12, 1941  3 Sheets-Sheet 1

JOSEPH MIHALYI
INVENTOR

BY
ATTORNEYS

Sept. 12, 1944.   J. MIHALYI   2,358,082
DOUBLE EXPOSURE PREVENTION DEVICE
Filed March 12, 1941   3 Sheets-Sheet 2

JOSEPH MIHALYI
INVENTOR

BY

ATTORNEYS

Patented Sept. 12, 1944

2,358,082

UNITED STATES PATENT OFFICE 2,358,082

DOUBLE EXPOSURE PREVENTION DEVICE

Joseph Mihalyi, Rochester, N. Y., assignor to Eastman Kodak Company, Rochester, N. Y., a corporation of New Jersey Application March 12, 1941, Serial No. 382,965

22 Claims. (Cl. 95—32)

This invention relates to cameras and particularly to double exposure prevention devices.

One object of my invention is to provide a camera in which the sequence of operations required for making successive pictures can only take place in such a manner that each area of film will be exposed only once and in such a manner that there will be no blanks between exposure areas. Another object of my invention is to provide a camera construction which can be successfully used with a setting type of shutter and without a latch in the shutter for holding the trigger against movement until the shutter is set. Still another object of my invention is to provide a latching mechanism for a double exposure prevention camera in which a known type of setting shutter can be used and in which the tensioning of the shutter in the normal manner will affect the latching mechanism on the camera body so that it is impossible to operate the camera release before the shutter has been set and a film has been wound. Still another object of my invention is to provide a camera with a setting shutter in which mechanism on the camera body controls the operation of the shutter release and in which movement of the shutter setting lever affects the shutter release control on the camera body. Other objects will appear from the following specification, the novel features being particularly pointed out in the claims at the end thereof.

In the many known types of double exposure prevention devices, a locking mechanism has been provided for the shutter trigger which could be locked after one exposure and released by winding a fresh area of film into place. While such mechanisms were entirely satisfactory for the so-called automatic type of shutter in which an exposure may be made by merely depressing the shutter trigger, they were not satisfactory for shutters of the setting type in which the shutter spring had to be manually tensioned before an exposure could take place, because in this latter type of shutter, if the operator forgot to tension the shutter spring, he could still operate the shutter trigger, causing the latch mechanism to prevent a second actuation of the trigger without winding film. Consequently, a film area would be wasted.

With my improved type of latching mechanism, I have been able to utilize a known type of photographic shutter and to positively overcome this difficulty, as will be fully described in the following specification.

Coming now to the drawings in which like reference characters denote like parts throughout.

In the preferred embodiment of my invention, I have provided a double exposure prevention mechanism which includes a latch structure on the camera body and a connection between this structure and a shutter of the setting type. Such a shutter must include a trigger and a setting lever and the shutter must be so built that the trigger moves a material distance each time the shutter is set. A typical shutter which may be used is the shutter shown in Patent No. 2,099,866, Riddell, granted November 23, 1937. In this shutter, by moving the setting lever, a cam presses against the end of a trigger which forms a latch member, so that the trigger is moved during the setting operation a distance substantially the same as it is moved for releasing the shutter.

Moreover, the shape of the cam is such that the trigger is moved positively, and considerable force can be transmitted to it.

I utilize this latching mechanism so that the connection between the camera body and the shutter may transmit power from a shutter release on the camera body to the camera trigger to make an exposure and so that the shutter setting lever may transmit motion to the shutter trigger and through the connections to the camera body to effect the latching mechanism and control the operation of the release so that the release can only be operated after the shutter has been set and can only be operated after the film has been wound.

Figure 12:
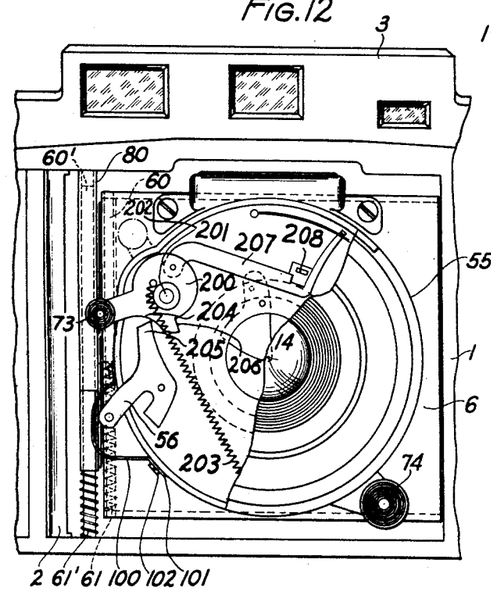
Fig. 12 is a fragmentary front elevation of the camera illustrating a typical shutter and associated mechanism which may be used in a preferred embodiment of my invention.

More specifically, I have illustrated in the drawings a preferred embodiment of my invention. This may consist of a camera body 1, having a hinged bed 2 and having a top cap 3 which covers the double exposure prevention mechanism. The camera is of the type employing roll film and a winding knob 4 may be mounted on the top wall for moving areas of film into place. There may be an exposure counter 5 which will indicate the number of exposures made. A lens board 6, which may be attached to the bed 2 by means of a bracket 7 and which may be supported by a pair of levers 11 and 12, carries a shutter 13 of the type described above. This shutter has an objective 14, as shown in Fig. 12, the front element of which may be carried by a suitable lens cell 15. A bellows 16 connects the lens board 6 and the camera body 1. As thus far described, the camera may be of any well known type.

When the cap 3 is removed from the camera body, a mechanism plate 10 will be exposed, this plate carrying most of the mechanism for preventing double exposures. A shutter release 17 on the camera body projects through the cap 3 and is slidably mounted in this cap. The lower end 18 of the release 17 contacts with a lever 19, which forms part of the shutter release on the camera body.

Figure 2:
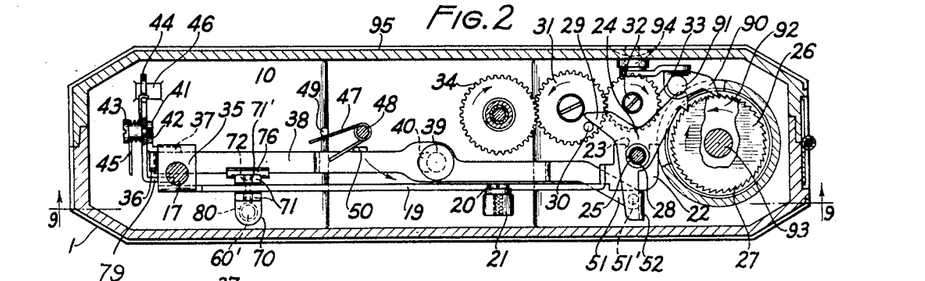
Fig. 2 is a fragmentary plan view with the cap, normally covering the double exposure prevention mechanism, removed from the camera.
Figure 9:
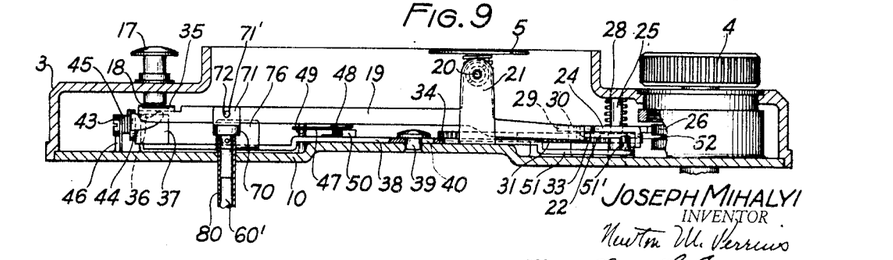
Fig. 9 is a sectional view taken on line 9—9 of Fig. 2.
Figure 10:
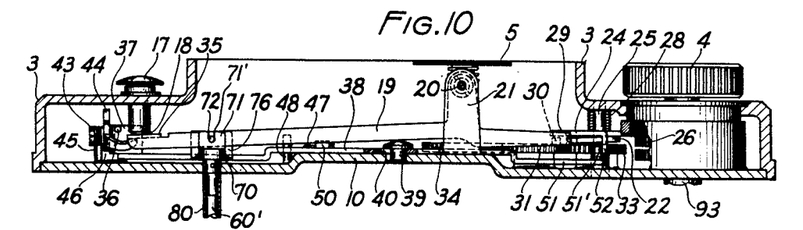
Fig. 10 is a view similar to Fig. 9, but with the shutter trigger depressed.
Figure 11:
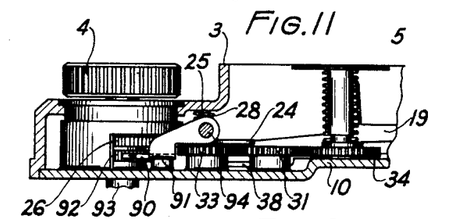
Fig. 11 is a fragmentary detail section showing a portion of the film counting mechanism.

As best shown in Fig. 2, lever 19 is pivoted at 20 to a lug 21, carried by the mechanism plate and the lever is formed on one end 22 with a fork 23 which engages the under side of a pawl 24 which is mounted to both turn and slide axially of a pivot 25, best shown in Figs. 9 and 10. When the release 17 is moved, the lever 19 is rocked so that the fork 23 causes the pawl to slide axially of its pivot 25 from the position shown in Fig. 9 to the position shown in Fig. 10, in which latter position the pawl has been raised above the ratchet wheel 26 so that it no longer engages the teeth 27 of the ratchet.

Figure 7:
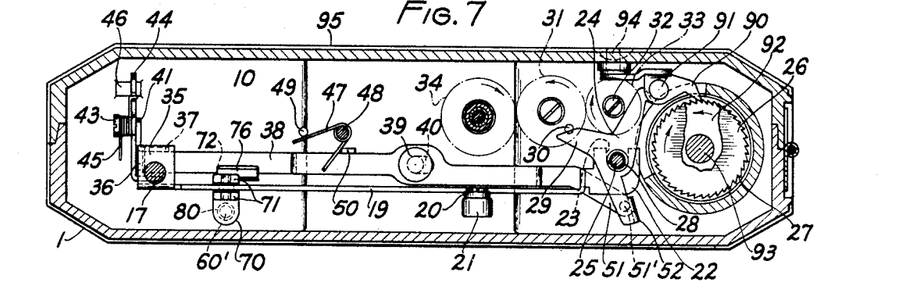
Fig. 7 is a view similar to Fig. 2, but with the parts in a position for winding film.
Figure 8:
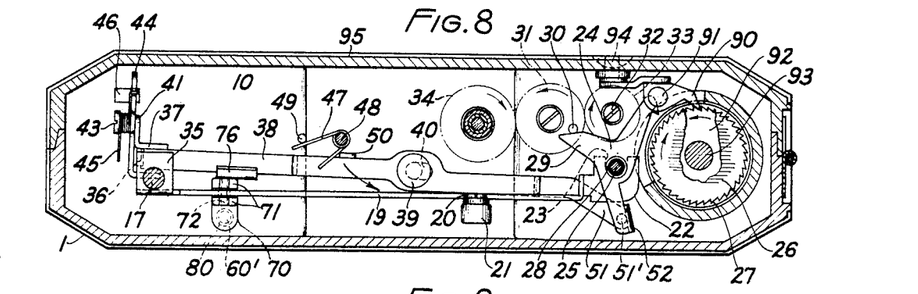
Fig. 8 is a view similar to Fig. 2, but with the parts in a position they would assume if the shutter has been set but the film has not yet been wound.

When this happens, a spring 28 encircling the post 25 swings the pawl to the position shown in Figs. 7 and 8, so that the film may be wound by turning the winding knob 4.

When the fork 23 raises the pawl 24, it also raises the arm 29 of the pawl above a pin 30, carried by the gear 31. The spring which turns the pawl causes it to turn over the top of the pin 30, as indicated in Fig. 7 and at the same time the spring 28 exerts a downward thrust upon the pawl, but the pawl cannot move downwardly because of the pin 30.

When the knob 4 is turned to wind film, the film will turn a known type of pinwheel or sprocket carried by the shaft 32 which fixedly carries the gear 33. Thus, as the winding movement starts, the pin 30 will be drawn from beneath the arm 29 so that the pawl will move downwardly on its shaft 25, but it will still be held away from the ratchet 27. Movement of the winding knob is continued, causing the pin 30 to turn in a counter-clockwise direction until it again strikes the arm 29, thereby turning the pawl into engagement with the ratchet and latching the winding member so that no further film can be advanced.

If desired, a film counter may be used and this may consist of a gear 34, having one more tooth than the gear 31, so that it may indicate on a dial 5 the number of film areas which have been exposed. Such counters are known.

Figure 5:
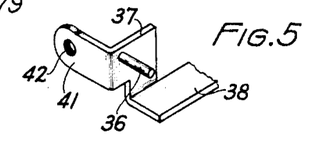
Fig. 5 is a fragmentary perspective view of the end of the main latching element.

Referring to Fig. 2, the lever 19 carries an inwardly projecting flange 35 which serves a number of purposes. This flange lies beneath the inner end 18 of the release on the camera body 17 and forms a flat area of contact with the release. In addition, it forms a flange which provides a contacting surface for either of two abutments 36 or 37, both of which are carried by a latching lever 38. This lever is movably mounted on the mechanism plate as it is mounted to both turn and slide through the pin 39 and slot 40 connection it has with the mechanism plate. The end of this lever 38 is shown in Fig. 5, where one abutment 36 is indicated as being a pin and where the other abutment 37 is indicated as being a formed part of the lever 38.

Figures 1, 3, 4:
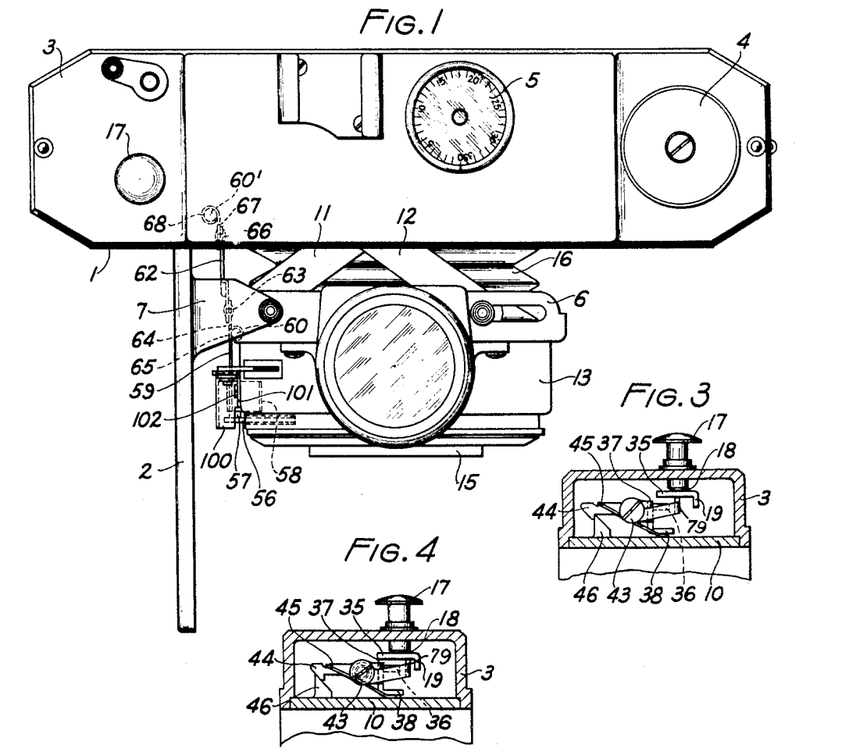
Fig. 1 is a top plan view of a typical camera including a double exposure prevention mechanism constructed in accordance with and embodying a preferred form of my invention.
Fig. 3 is a fragmentary section taken on line 3—3 of Fig. 6, the catch being shown in its operative position.
Fig. 4 is a view similar to Fig. 3, but with the catch in an unlatched position.

This lever also has a formed-over end 41 perforated at 42 to receive a stud 43 on which the small catch 44 shown in Figs. 3 and 4 may be mounted, there being a spring 45 normally tending to turn this catch downwardly and into engagement with a lug 46 on the mechanism plate 10.

A spring 47, encircling a pin 48 on the mechanism plate and pressing upon a pin 49, carried thereby by engaging a lug 50 on the lever 38, tends to move the lever in the direction shown by the arrow about the stud 39.

Lever 38 is provided with an extension on its opposite end 51 carrying a pin 51' which may engage a downwardly extending flange 52, carried by the pawl 24. Thus, the pawl 24 may be moved by the lever 19 or the lever 38 through the movement of these levers, which may occur in the following manner.

Assuming that the film has been wound after an exposure has been made until the pin 30 strikes arm 29 of pawl 24, causing this pawl to engage the teeth 27 of the ratchet, as shown in Fig. 2, it will be noted that the pin 30, by striking the arm 29, has moved the pawl to its operative position. This movement also caused the flange 52 of the pawl to engage the latching pin 51' of extension 51, moving the latching member 38 to the left with reference to Fig. 2 through its pin 39 and slot 40 connection with the mechanism plate, and this movement removes abutment 36 from beneath the flange 35. Thus, although the film has been wound and one abutment has been removed from beneath the shutter release on the camera body, it will be seen that the release cannot be depressed because there is still a second abutment 37 beneath the flange 35. If an operator should try to depress the push button 17, he could not do so. If he has forgotten whether or not a film has been wound and should now try to turn knob 4, it would not turn, so that he would know film had been wound. This would call his attention to the fact that the shutter was not set.

Figure 13:
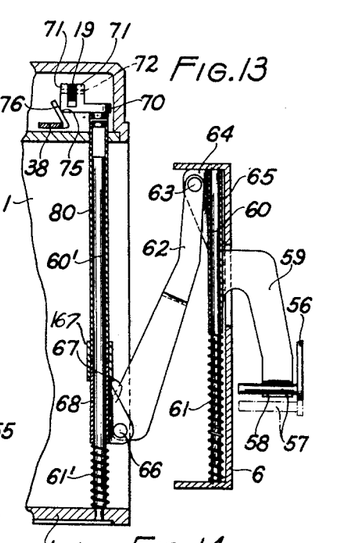
Fig. 13 is a fragmentary detail section showing a connection between the camera body and shutter by which motion may be transmitted from one part to the other.
Figure 14:
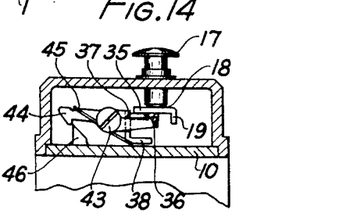
Fig. 14 is a view similar to Figs. 3 and 4, but with the catch in a different position.

Referring to Fig. 12, a shutter 55 of the type described above is shown as being mounted on the lens board 6. This shutter is provided with a trigger 56, having an inwardly extending pin 57 which, as best shown in Fig. 13, slidably engages a fork 58 in a lever slidably mounted upon a rod 60 but normally held in the position shown in this figure by a spring 61. A link 62, pivoted at 63 to a flange 64 forming a part of the tubular member 65, constitutes a hinge connection between the link and flange. The link 62 is similarly hinged at 66 to a flange 67, carried by a tubular slide 68 mounted on a rod 60'. Rod 60' also slidably supports a tube 80 pinned to cross head 70 and movable therewith. A sleeve 167 connects tubes 68 and 80 to move as a unit. A spring 61' normally holds the tubular member 68 in the position illustrated. In closing the camera the linkage is not moved sufficiently to affect the mechanism, but when the trigger is moved the extent of movement is greater and causes the mechanism to function. The upper end of the tubular slide 80 is provided with a cross head 70, this cross head being provided with one or more ears 71 through which a slot 71' extends. A pin 72 passes into these slots to connect the cross head 70 with the lever 19. Thus the cross head lies in the path of movement of the pin 72 when the lever 19 carrying this pin is moved downwardly by the shutter release 17 carried by the camera body. However, the cross head 70 may move downwardly without moving lever 19 as the slot 71' permits the pin 72 to remain stationary when the cross head 70 is moved from the camera shutter as will be hereinafter more fully described. Thus, by depressing the lever 17 (when it can move downwardly), the lever 19 moves downwardly and through the slidable members 68 and 65 and the link 62 and through the lever 59, it will transmit motion to the shutter trigger 56. It should be especially noted here that while movement may be transmitted from the release 17 to the trigger 56 with its pin 57, the construction of the parts is such that movement can also be transmitted in a reverse direction from the trigger 57 to the mechanism on the camera body through the cross head 70 without moving lever 19.

Referring also to Fig. 12, it will be noticed that the shutter is provided with a shutter setting lever 73 which must be moved from the full line position in Fig. 12 to the broken line position in this figure in order to tension the shutter spring before exposure. As above explained, this shutter may be of the type shown in the Riddell patent in which such a setting movement of the shutter setting lever 73 causes the trigger 57 to move a material distance. This is done in the following manner. As shown in Fig. 12, the setting lever forms a part of a master member 200 pivotally mounted at 201 to the casing 202. A spring 203 tends to turn the master member 200 in a counterclockwise direction. In setting, the cam 204 of the master member 200 moves latch arm 205 of trigger 56 until it snaps behind the latch element 206 of the master member. The extent of the trigger movement thus caused in setting the shutter is nearly that of the movement required for making an exposure. A latch arm 207 operates a blade ring lug 208 in a known manner and as fully shown in the Riddell patent above referred to. If desired, a focusing lever 74 may be employed to focus the shutter and objective 14 relative to the lens board 6, or, if desired, a known type of focusing objective may be employed.

As above described, after the film has been wound and the parts are in the position of Fig. 2, the operator will note he cannot turn the winding knob 4, and consequently, he will know that he must next set his shutter. He therefore moves the lever 73 from the full line to the broken line position of Fig. 12. This movement causes the trigger 56, with its pin 57, to move from the position shown in full lines to the position shown in broken lines and back again. The movement in a downward direction will cause the cross head 70 to move downwardly and without moving lever 19. When this occurs, the end 75 of the cross head 70 will engage a cam 76, carried by the lever 38, thus moving this lever about the stud 39 and causing the catch 44 to snap over the lug 46 and hold the shutter parts in the position shown in Fig. 6. It will be noticed from this figure that the second abutment 37, which, before the shutter setting operation, laid beneath the flange 35, has been removed from this position so that now both abutments 36 and 37 lie out of the path of the release on the camera body being moved in a direction to make an exposure. The camera is therefore ready to make an exposure.

This can be done by depressing the release 17 on the camera body. It should be noted that a guard 100 prevents the operator from depressing the shutter trigger 57. This guard may be in the form of a plate formed over at 101 and attached to the shutter casing as by screws 102.

Figure 6:
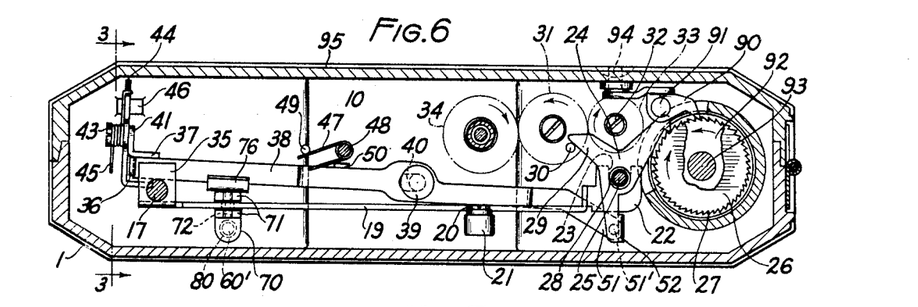
Fig. 6 is a view similar to Fig. 2, but with the parts in position to make an exposure.

The catch 44 includes a bent arm 79 which lies beneath the flange 35 even after both of the abutments 36 and 37 have been removed therefrom, as shown in Fig. 6. Consequently, when the flange 35 is lowered in making an exposure, it will raise the catch 44 so that it may release the lug 46 so that the spring 47 immediately moves the lever 38 to the position shown in Fig. 7, in which position the abutments 36 and 37 have been brought back to a blocking position beneath the flange 35.

The downward movement of the release 17 in making an exposure has, of course, also raised the pawl 24 over the top of the pin 30 so that the parts are in the position shown in Fig. 7.

If now the operator should again depress the shutter release 17, nothing would happen because it could not be moved a distance sufficient to make an exposure. The operator may therefore do either one of two things. He may wind film first, as described above, or he may choose to set the shutter first. If he should choose to set the shutter first, he would move lever 73 from the full to the broken line position (Fig. 12). This movement through the linkage connecting the shutter trigger would cause the cross head 70 to move free from lever 19 and to engage the cam 76 on the lever 38 so that this lever would be swung against the action of the spring 47 and so that the catch 44 would again engage the lug 46. Thus, the abutment 37 would be removed from beneath the flange 35 due to setting the shutter, but the shutter release still could not be depressed because of the opposite abutment 36 which still lies in the path of the release 17 on the camera body. Therefore, the operator would know that still another operation is necessary before the camera can be actuated.

The parts are now in the position shown in Fig. 8, and when the winding knob 4 is turned, the pin 30 will be drawn out from beneath the arm 29 and the winding can continue until this pin 30 reaches the position shown in Fig. 2 after first striking the arm 29 of the pawl and moving it into engagement with the teeth 27 of the ratchet 26. This movement causes flange 52 to move the latching member 38 to the left with respect to Fig. 8 until it reaches the position shown in Fig. 6, in which position both abutments 36 and 37 have been removed from the path of the release 17.

It should be noticed that with the construction above described I have provided a latching mechanism on the camera body which both latches a shutter release against movement and which releases the shutter release latch through the action of setting a shutter. It does not require a special shutter having a supplementary latch mechanism inside the shutter casing or outside the casing for holding the trigger against movement until the shutter is set. It greatly reduces the complication of a double exposure prevention device, and it renders such a device absolutely foolproof because, as above explained, it does not matter in what sequence an operator performs the three necessary functions for taking a picture with this camera or with any other camera employing a setting shutter—that is, (1) actuating the shutter by depressing the release, (2) winding the film, (3) setting the shutter. Since it is only possible to actuate the shutter release after the shutter has been set and after the film has been wound, and since it is immaterial whether the film is wound or the shutter is set as the first act of preparing for the next exposure, it will be seen that it is impossible to operate this shutter mechanism improperly. Moreover, the parts are so arranged that there are no parts which can be damaged by an attempt to operate any of the shutter parts improperly. The abutments 36 and 37 are quite substantial, and since the latching member 38 normally rests against the top of the mechanism plate 16, there is no danger of bending or dislocating these parts even with unusually heavy pressure upon the release 17. Since the pawl 24 is of substantial construction and is anchored upon a substantial pivot 22, there is no danger of manually applying a sufficient torque to the winding knob 4 to strip any of the teeth 27 of the ratchet.

In cameras utilizing 35 mm. film, it is customary to rewind film back into an original retort or onto an original supply spool. I therefore provide a pawl 90, pivotally attached at 91, to the camera body and engaging a second ratchet wheel 92 on the winding knob shaft 93. The purpose of this pawl and ratchet is to prevent movement of the winding knob 4 in a direction opposite to that shown by the arrow in Figs. 1 and 2. However, if it should be desirable to wind the film back, as above explained, a pushbutton 94 may be provided on the camera back 95 which can be manually depressed to hold the pawl 90 out of the ratchet 92 and permit such rewind movement. Such constructions are known in the camera art.

It is to be understood that while I have described and illustrated a preferred embodiment of my invention and have referred to a shutter of a construction which is preferred for my invention, many modifications can be made and other suitable shutters can be found, and I consider as within the scope of my invention all such modifications as may come within the scope of the appended claims.

I claim:

1. In a roll film camera having a film winding device and a shutter of the type requiring a setting lever for tensioning the shutter before an exposure may be made and in which movement is transmitted from the setting lever to the trigger in setting the shutter, the combination with a shutter release on the camera body movable through a path, connections between the shutter trigger and the release on the camera body, a latching member carried by the camera body, two detents on the latching member, both of said detents being movable to and from the path of movement of the camera release to block and permit movement thereof, means for removing one detent from the path of the camera release actuated by winding film, and means for removing the second detent from the path of the camera release including the connections between the shutter trigger and camera release operable by the trigger in setting the shutter, whereby said shutter may be actuated only after the film has been wound and the shutter has been set.

2. In a roll film camera having a film winding device and a shutter of the type requiring a setting lever for tensioning the shutter before an exposure may be made and in which movement is transmitted from the setting lever to the trigger in setting the shutter, the combination with a shutter release on the camera body movable through a path, connections between the shutter trigger and the release on the camera body, a latching member movably mounted on the camera body, two detents carried by the latching member, each detent being movable by the latching member to an operative blocking position with respect to the shutter release on the camera body and to an inoperative non-blocking position with respect thereto, means operable by winding film for moving one detent to an inoperative position, means including the connections between the shutter trigger and the camera body release for moving the other detent from its operative position, said shutter release on the camera body being operable to release the shutter only after both detents are moved to an inoperative position.

3. In a roll film camera having a film winding device and a shutter of the type requiring a setting lever for tensioning the shutter before an exposure may be made and in which movement is transmitted from the setting lever to the trigger in setting the shutter, the combination with a shutter release on the camera body movable through a path, connections between the shutter trigger and the release on the camera body, a latching member movably mounted on the camera body, two detents carried by the latching member, each detent being movable by the latching member to an operative blocking position with respect to the shutter release on the camera body and to an inoperative non-blocking position with respect thereto, means operable by winding film for moving one detent to an inoperative position, means including the connections between the shutter trigger and the camera body release for moving the other detent from its operative position, said shutter release on the camera body being operable to release the shutter only after both detents are moved to an inoperative position, said shutter release on the camera body including a means for moving the latching member when the release is moved to actuate a shutter whereby the detents may again prevent movement of the shutter release.

4. In a roll film camera having a film winding device and a shutter of the type requiring a setting lever for tensioning the shutter before an exposure may be made and in which movement is transmitted from the setting lever to the trigger in setting the shutter, the combination with a shutter release on the camera body movable through a path, connections between the shutter trigger and the release on the camera body, said shutter release on the camera body comprising a pivoted lever having a push button release on one end and a pawl operating arm on the other end, a movably mounted latching member carried by the camera, a pawl pivotally carried thereby, a ratchet on the film wind adapted to be engaged by the pawl, a catch on the opposite end of the latching member, a pair of detents carried by said member and adapted to be positioned in operative positions for blocking movement of the release on the camera body, a spring tending to move said latching member in one direction, means carried by the shutter release on the camera body for moving the latching bar to a pawl releasing position through said pawl operating arm, a film measuring roll mechanism including a pawl moving member, and means also carried by the camera body release for moving the latching member when making an exposure whereby said pawl may again engage said ratchet when the pawl moving pin carried by the film measuring roll mechanism engages and moves the pawl into engagement with said ratchet.

5. In a roll film camera having a film winding device and a shutter of the type requiring a setting lever for tensioning the shutter before an exposure may be made and in which movement is transmitted from the setting lever to the trigger in setting the shutter, the combination with a shutter release on the camera body movable through a path, connections between the shutter trigger and the release on the camera body, said shutter release on the camera body comprising a pivoted lever having a push button release on one end and a pawl operating arm on the other end, a movably mounted latching member carried by the camera, a pawl pivotally carried thereby, a ratchet on the film wind adapted to be engaged by the pawl, a catch on the opposite end of the latching member, a pair of detents carried by said member and adapted to be positioned in operative positions for blocking movement of the release on the camera body, a spring tending to move said latching member in one direction, means carried by the shutter release on the camera body for moving the latching bar to a pawl releasing position through said pawl operating arm, a film measuring roll mechanism including a pawl moving member, and means also carried by the camera body release for moving the latching member when making an exposure whereby said pawl may again engage said ratchet when the pawl moving pin carried by the film measuring roll mechanism engages and moves the pawl into engagement with said ratchet, said latching member being movable to a plurality of positions, a spring catch carried by the latching member for holding said member in one position, and means carried by the latching member for preventing the operation of the shutter release on the camera body when said catch is in a latch member holding position.

6. In a roll film camera having a film winding device and a shutter of the type requiring a setting lever for tensioning the shutter before an exposure may be made and in which movement is transmitted from the setting lever to the trigger in setting the shutter, the combination with a shutter release on the camera body movable through a path, connections between the shutter trigger and the release on the camera body, said shutter release on the camera body comprising a pivoted lever having a push button release on one end and a pawl operating arm on the other end, a movably mounted latching member carried by the camera, a pawl pivotally carried thereby, a ratchet on the film wind adapted to be engaged by the pawl, a catch on the opposite end of the latching member, a pair of detents carried by said member and adapted to be positioned in operative positions for blocking movement of the release on the camera body, a spring tending to move said latching member in one direction, means carried by the shutter release on the camera body for moving the latching bar to a pawl releasing position through said pawl operating arm, a film measuring roll mechanism including a pawl moving member, and means also carried by the camera body release for moving the latching member when making an exposure whereby said pawl may again engage said ratchet when the pawl moving pin carried by the film measuring roll mechanism engages and moves the pawl into engagement with said ratchet, said latching member being movable to a plurality of positions, a spring catch carried by the latching member for holding said member in one position, and means carried by the latching member for preventing the operation of the shutter release on the camera body when said catch is in a latch member holding position, said means being brought into an operative shutter release blocking position through the operation of the shutter release in making an exposure.

7. In a roll film camera including a film winding device, a shutter of the type requiring a setting lever for tensioning the shutter and a trigger for releasing the shutter said trigger being positively moved through shutter mechanism in setting the shutter, the combination with a shutter release on the camera body of connections between the shutter release on the camera and the shutter trigger for moving the parts in unison, a latching member movably mounted on the camera to move between three primary positions, two detents carried by the latching member adapted to be moved to and from an operative position in the path of movement of the release on the camera body to prevent movement thereof, and a catch means between the latch members and camera body for holding the former in a position in which both detents may be inoperative to block movement of the release on the camera body.

8. In a roll film camera including a film winding device, a shutter of the type requiring a setting lever for tensioning the shutter and a trigger for releasing the shutter said trigger being positively moved through shutter mechanism in setting the shutter, the combination with a shutter release on the camera body of connections between the shutter release on the camera and the shutter trigger for moving the parts in unison, a latching member movably mounted on the camera to move between three primary positions, two detents carried by the latching member adapted to be moved to and from an operative position in the path of movement of the release on the camera body to prevent movement thereof, and a catch means between the latch members and camera body for holding the former in a position in which both detents may be inoperative to block movement of the release on the camera body, a cam on the release on the camera body for releasing said catch means as an exposure is being made, and a spring for moving the latching member to operatively position both detents in a release blocking position.

9. In a roll film camera including a film winding device, a shutter of the type requiring a setting lever for tensioning the shutter and a trigger for releasing the shutter said trigger being positively moved through shutter mechanism in setting the shutter, the combination with a shutter release on the camera body of connections between the shutter release on the camera and the shutter trigger for moving the parts in unison, a latching member movably mounted on the camera to move between three primary positions, two detents carried by the latching member adapted to be moved to and from an operative position in the path of movement of the release on the camera body to prevent movement thereof, and a catch means between the latch members and camera body for holding the former in a position in which both detents may be inoperative to block movement of the release on the camera body, a cam on the release on the camera body for releasing said catch means as an exposure is being made, and a spring for moving the latching member to operatively position both detents in a release blocking position, and separate means, one on the camera, and the other including the shutter setting lever, trigger, connections between the trigger and release on the camera body, each means being adapted to engage and move the latching member to move one detent to an inoperative position with respect to the shutter release on the camera body.

10. In a roll film camera including a film winding device, a shutter of the type requiring a setting lever for tensioning the shutter and a trigger for releasing the shutter said trigger being positively moved through shutter mechanism in setting the shutter, the combination with a shutter release on the camera body of connections between the shutter release on the camera and the shutter trigger for moving the parts in unison, a latching member movably mounted on the camera to move between three primary positions, two detents carried by the latching member adapted to be moved to and from an operative position in the path of movement of the release on the camera body to prevent movement thereof, and a catch means between the latch members and camera body for holding the former in a position in which both detents may be inoperative to block movement of the release on the camera body, a cam on the release on the camera body for releasing said catch means as an exposure is being made, and a spring for moving the latching member to operatively position both detents in a release blocking position, and separate means, one movable by the film wind, and the other movable by the shutter setting lever through the shutter trigger, connections between the trigger and the release on the camera body for moving the detents to an inoperative position with respect to the release on the camera body to position the parts for an exposure.

11. In a roll film camera having a film winding device and a shutter of the type requiring a setting lever for tensioning the shutter before an exposure may be made and in which movement is transmitted from the setting lever to the trigger in setting the shutter, the combination with a shutter release on the camera body movable through a path, connections between the shutter trigger and the release on the camera body, a latching member movably carried by the camera body including spaced detents both positioned so that each detent may be positioned by movement of the latching member to block movement of the release on the camera body, a catch means between the latching member and camera body for holding said detents in an inoperative position and means on the release on the camera body and operable by the shutter setting lever for releasing said catch means between the latching member and camera body.

12. In a photographic camera including a shutter of the type requiring setting before an exposure can be made and having a trigger and a setting lever, the setting lever moving the trigger a material distance when said setting lever is moved to set the shutter, the combination with a movable arm having an operative position in which it prevents actuation of the trigger to release the shutter, of a cross head adjacent said arm, a cam for moving said arm by said cross head, a shutter trigger release carried by the camera body, a movable mechanism connected to and operable with the shutter trigger and connected to said cross head, said shutter setting lever being adapted to move said shutter trigger and through the movable mechanism the cross head, said cam being operable by said movable mechanism for moving said movable arm from its operative position in which it prevents actuation of the trigger release carried by the camera body.

13. In a photographic camera including a shutter of the type requiring setting before an exposure can be made and having a trigger and a setting lever, the shutter setting lever moving the trigger a material distance when the setting lever is moved to set the shutter, the combination with a movable arm having an operative position in which it may prevent movement of the shutter trigger, a shutter release carried by the camera body, a cross head lying in the path of the shutter release carried by the camera body, a cam for moving the arm by the cross head, a movable mechanism connecting the cross head and the shutter trigger, the shutter setting lever moving the shutter trigger and through said mechanism the cross head when said shutter setting lever is moved to set the shutter, said movement thereby causing said cross head to cam the arm from its operative latching position when the shutter is set.

14. In a photographic camera including a shutter of the type requiring setting before an exposure can be made and having a trigger and a setting lever, the setting lever moving the trigger a material distance when the setting lever is moved to set the shutter, the combination with a shutter release on the camera body, of a movable arm having an operative position in which it may prevent an actuation of the shutter release on the camera body, of mechanism positioned to be operated by the shutter release carried by the camera body, a cam positioned to engage the movable arm and to be actuated by the mechanism lying in the path of the shutter release carried by the camera body, said movable mechanism being adapted to transmit motion from the shutter release carried by the camera body to the camera trigger for making an exposure and also being adapted to transmit motion from the shutter trigger to operate the cam, thereby moving the arm to its inoperative position for releasing the shutter release carried by the camera body after the shutter has been set.

15. In a photographic camera including a shutter of the type including a trigger and a shutter setting lever so constructed that the trigger is moved a material distance when the shutter is set, the combination with a shutter release carried by the camera body, of a latching mechanism for the shutter release carried by the camera body, connecting mechanism between the shutter release latching mechanism and the shutter trigger including a cam and a cam follower carried by the connecting mechanism and latching mechanism, said cam and cam follower moving the shutter release latching mechanism carried by the camera body when said shutter trigger is moved by moving the shutter setting lever.

16. In a photographic camera including a shutter of the type having a trigger and a setting lever so constructed that the trigger is moved a material distance as the shutter is set, the combination with a shutter release carried by the camera body, of a latching mechanism for the shutter release carried by the camera body, said latching mechanism including a lever, the shutter release carried by the camera body being positioned adjacent to and adapted to be contacted by the latching mechanism for the shutter release carried by the camera body, mechanism connecting the shutter release carried by the camera body and the trigger of the shutter including a cross head, a lost motion connection between the cross head and the shutter release carried by the camera body, and a cam positioned to engage and move said arm, whereby the shutter release carried by the camera body may transmit motion to the shutter trigger through said mechanism connecting the shutter release carried by the camera body and the trigger, and whereby movement of the trigger under the impulse of movement of the setting lever in setting the shutter may transmit movement in an opposite direction through said mechanism connecting the cross head to the shutter trigger for unlatching the shutter release latching mechanism as the shutter is set.

17. In a camera including a camera body, a camera front, and a shutter of the type requiring a setting lever to tension a shutter spring before making an exposure and a trigger for holding the shutter in a set position and for releasing the shutter to make an exposure, said shutter including mechanism for moving the trigger a material distance during the setting of a shutter, the combination with a shutter release carried by the camera body, of mechanism lying in the path of and adapted to be operated by the shutter release carried by the camera body and to be operated by the shutter trigger, a latch mechanism for the shutter release carried by the camera body, cam means for moving said latch mechanism through the mechanism lying in the path of the shutter trigger carried by the camera body, connections between the mechanism lying in the path of the shutter trigger carried by the camera body and the shutter trigger, whereby when the shutter trigger is moved through the action of setting the shutter, the latch mechanism may move from its latching position through movement of said cam means.

18. In a camera including a camera body, a camera front, and a shutter of the type requiring a setting lever to tension a shutter spring before making an exposure and a trigger for holding the shutter in a setting position and for releasing the shutter to make an exposure, said shutter including a first mechanism for moving the trigger a material distance during the setting of the shutter, the combination with a shutter release for the shutter carried by the camera body, of a second mechanism lying in the path of movement of the shutter release carried by the camera body, said second mechanism being directly connected to the shutter trigger to move therewith, whereby the mechanism may be moved in a direction to release the shutter trigger when pressure is applied to the shutter release carried by the camera body, said mechanism lying in the path of movement of the shutter release carried by the camera body being movable with the shutter trigger without moving the shutter release carried by the camera body when the shutter setting lever is moved to set the shutter, whereby said second mechanism lying in the path of the shutter release carried by the camera body may move independently thereof, a latching arm movably mounted to move to and from a position blocking movement of the shutter release on the camera body and a cam operable by the mechanism attached to the shutter trigger and moving the cam to release the latching arm after the shutter is set.

19. In a photographic camera including a shutter of the type having a trigger and a setting lever so constructed that the trigger is moved a material distance in setting the shutter, the combination with a shutter release for the shutter carried by the camera body, of mechanism including a lever lying in the path of the shutter release carried by the camera body and adapted to prevent movement thereof, connections between said mechanism and the shutter trigger, a shutter release latching mechanism carried by the camera adjacent the shutter release for the shutter carried by the camera body, means for transmitting motion through said shutter release latching mechanism including the lever lying in the path of the shutter release for the shutter carried by the camera body and connected to the shutter trigger including first, the shutter release for the shutter carried by the camera body which may transmit motion through said mechanism lying in the path of the shutter release for the shutter carried by the camera body in a direction to trip the shutter and make an exposure, and second, the shutter setting lever which may transmit motion through the trigger and said mechanism including a lever lying in the path of the shutter release for the shutter carried by the camera body latching mechanism to release said latching mechanism when said shutter setting lever is moved to set the shutter.

20. In a camera including a camera body, a camera front, and a shutter of the type requiring a setting lever to tension a shutter spring before making an exposure and a trigger for holding the shutter in a set position and for releasing the shutter to make an exposure, said shutter including a first mechanism for moving the trigger a material distance during the setting of the shutter, the combination with a first manually operable member comprising a shutter release for the shutter carried by the camera body, of a second mechanism including a lever lying in the path of movement of the shutter release for the shutter carried by the camera body, said second mechanism being connected to move with the shutter trigger, the second manually operable member comprisng the said shutter setting lever, a latch mechanism for the shutter release for the shutter carried by the camera body, means including the latch mechanism and the second mechanism including the lever lying in the path of the shutter release for the shutter carried by the camera body and connected to the shutter trigger for releasing the latch mechanism through movement of the second manually operable member, and means carried by the camera and including the latching mechanism for preventing the operation of the two manually operable parts without first operating the other manually operable parts.

21. In a camera including a camera body, a camera front, and a shutter of the type requiring a setting lever to tension a shutter spring before making an exposure and a trigger for holding a shutter in a set position for releasing the shutter to make an exposure, said shutter including a first mechanism for moving the trigger a material distance during the setting of the shutter, the combination with a shutter release for the shutter carried by the camera body, of an operable second mechanism including a lever lying in the path of the shutter release for the shutter carried by the camera body, connections between said second mechanism and the shutter trigger, a guard normally preventing manual operation of the shutter trigger, a latch mechanism for the shutter release for the shutter carried by the camera body and including said lever, means including said latch mechanism and lever, and said latch mechanism lying in the path of the shutter trigger carried by the camera body and connected to the trigger for releasing the latch mechanism through movement of the shutter setting lever without moving the shutter trigger carried by the camera body, and means included in the latching second mechanism carried by the camera body for restraining the operation of the shutter release for the shutter carried by the camera body until the shutter setting lever has first been operated.

22. In a roll film camera having a film winding device and a shutter of the type requiring a setting lever for tensioning the shutter before an exposure may be made and in which movement is transmitted from the setting lever through the trigger and setting the shutter, the combination with a hinged shutter release carried by the camera body and movable through a path of movement, a cross head lying in the path of movement of the hinged shutter release in position to be operated thereby and movable independently thereof, a linkage connected to the shutter trigger and to the cross head, a latching member movably mounted on the camera body and positioned to be engaged and moved by the cross head, a detent carried by the latching member and adapted to be moved thereby to an operative shutter release blocking position, a catch means consisting of two parts, one carried by the latching member and the other carried by the camera body for holding the detent out of an operative position, cam surfaces on the cross head and the latching member whereby the cross head may move the latching member to engage the catch means between the latching member and the camera body, whereby the shutter release carried by the camera body may operate the shutter trigger through the cross head and linkage, and whereby the camera surfaces on the cross head and latching member may move the latch through movement of the cam as the shutter setting lever is moved, thereby moving the shutter trigger and said linkage.

JOSEPH MIHALYI.